United States Patent
Ehrensvärd et al.

(10) Patent No.: US 12,061,686 B2
(45) Date of Patent: *Aug. 13, 2024

(54) PRE-REGISTRATION OF AUTHENTICATION DEVICES

(71) Applicant: Yubico AB, Stockholm (SE)

(72) Inventors: Jakob Ehrensvärd, Palo Alto, CA (US); Christopher Harrell, San Jose, CA (US); Jerrod Chong, Palo Alto, CA (US)

(73) Assignee: Yubico AB, Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 18/201,653

(22) Filed: May 24, 2023

(65) Prior Publication Data

US 2023/0306103 A1    Sep. 28, 2023

Related U.S. Application Data

(63) Continuation of application No. 16/904,017, filed on Jun. 17, 2020, now Pat. No. 11,698,957.
(Continued)

(51) Int. Cl.
*G06F 21/00* (2013.01)
*G06F 21/44* (2013.01)
(Continued)

(52) U.S. Cl.
CPC .............. *G06F 21/44* (2013.01); *G06F 21/62* (2013.01); *H04L 63/06* (2013.01); *H04L 63/0876* (2013.01); *G06F 2221/2141* (2013.01)

(58) Field of Classification Search
CPC ......... G06F 21/44; G06F 21/62; H04L 63/06; H04L 63/0876
See application file for complete search history.

(56) References Cited

U.S. PATENT DOCUMENTS

| 8,806,586 B2 | 8/2014 | Ehrensvard et al. |
| 2009/0138699 A1 | 5/2009 | Miyazaki et al. |

(Continued)

FOREIGN PATENT DOCUMENTS

| JP | 2011-044018 A | 3/2011 |
| KR | 10-2016-0099358 A | 8/2016 |

(Continued)

OTHER PUBLICATIONS

Extended European Search Report, European Patent Office Patent Application No. 20214859.9, May 10, 2021, 10 pages.
(Continued)

*Primary Examiner* — Rodman Alexander Mahmoudi
(74) *Attorney, Agent, or Firm* — Fenwick & West LLP

(57) ABSTRACT

A system is disclosed for pre-registering authentication devices. A security key provider system may receive a request to pre-register a security key with identified applications from an enterprise. Responsive to receiving the request, the security key provider system instructs the security key to generate a unique authentication code for each of the applications. The security key provider system may generate pre-registration information based on the authentication codes and pre-register the authentication codes of the security key to the applications by providing the pre-registration information to the applications on behalf of the enterprise. The security key provider system may instead provide the pre-registration information to the enterprise to allow the enterprise to pre-register the authentication codes.

20 Claims, 5 Drawing Sheets

Related U.S. Application Data

(60) Provisional application No. 62/949,728, filed on Dec. 18, 2019.

(51) Int. Cl.
  *G06F 21/62* (2013.01)
  *H04L 9/40* (2022.01)
  *H04L 29/06* (2006.01)

(56) References Cited

U.S. PATENT DOCUMENTS

| | | |
|---|---|---|
| 2010/0050251 A1 | 2/2010 | Speyer et al. |
| 2011/0296522 A1 | 12/2011 | Speyer et al. |
| 2011/0314534 A1 | 12/2011 | James |
| 2013/0268766 A1 | 10/2013 | Schrecker |
| 2014/0325328 A1 | 10/2014 | Beadles |
| 2017/0005995 A1 | 1/2017 | Yang et al. |
| 2017/0323094 A1 | 11/2017 | Jain et al. |
| 2018/0091975 A1 | 3/2018 | Schrecker |
| 2018/0167383 A1 | 6/2018 | Mandyam et al. |
| 2018/0286216 A1 | 10/2018 | Sweeney et al. |
| 2018/0336547 A1 | 11/2018 | Finke et al. |
| 2019/0124081 A1 | 4/2019 | Nowak et al. |
| 2019/0370479 A1 | 12/2019 | Uhr et al. |

FOREIGN PATENT DOCUMENTS

| | | |
|---|---|---|
| KR | 10-1690989 B1 | 1/2017 |
| KR | 10-2017-0030886 A | 3/2017 |

OTHER PUBLICATIONS

Office Action, IP Australia Patent Application No. 2020273301, Jun. 21, 2021, 4 pages.

United States Office Action, U.S. Appl. No. 16/904,017, filed Nov. 29, 2021, 25 pages.

United States Office Action, U.S. Appl. No. 16/904,017, filed Jun. 3, 2022, 29 pages.

United States Office Action, U.S. Appl. No. 16/904,017, filed Sep. 14, 2022, 31 pages.

| Timestamp | Serial # | Application ID | Challenge | Public Point | Key Handle | Registration Signature | Attestation Certificate |
|---|---|---|---|---|---|---|---|
| 2018-01-01T12:34:56 | 1000000 | ... | ... | ... | ... | ... | ... |
| 2018-01-01T12:34:57 | 1000001 | ... | ... | ... | ... | ... | ... |
| 2018-01-01T12:34:57 | 1000002 | ... | ... | ... | ... | ... | ... |

FIG. 3

PRE-REGISTRATION OF AUTHENTICATION DEVICES

CROSS REFERENCE TO RELATED APPLICATIONS

This application is a continuation of U.S. patent application Ser. No. 16/904,017, filed Jun. 17, 2020, which claims the benefit of U.S. Provisional Application No. 62/949,728, filed Dec. 18, 2019, which are incorporated by reference in their entirety.

BACKGROUND

With growing concerns regarding cyber security, several methods of improving authentication have been developed. One such authentication method is two-factor authentication, which requires two factors for confirming a user's claimed identity at a time of access attempt. The factors used in two-factor authentication can include, for example, a secret (e.g., password, PIN), a physical object (e.g., a key, a bank card, a security key), location information (e.g., GPS signal, connection to a network), and/or inherence (e.g., biometrics).

To simplify the two-factor authentication across different online services, an open authentication standard called FIDO (Fast Identity Online) U2F (Universal $2^{nd}$ Factor) was created. According to FIDO/U2F/FIDO2 standards, a user logs into an account with an online service using a login and password as a first factor and presents a security key as a second factor. The security key conveniently allows internet users to access different online services using a single security key instead of using various drivers or client software, while providing high level of security and privacy to the users. When a user registers the security key for the first time for an account of an online service or an application, the security key generates a unique authentication code such as an asymmetric key pair and provides the public key to the online service to be associated with the account. Once the security key is registered, when the user authenticates to the account using the security key, the online service verifies user identity using the asymmetric key pair registered for the account. Because the security key generates a unique asymmetric key pair for each account, an online service cannot link different accounts that belongs to a same user even if the user is using the same security key to log into these different accounts from the same online service. This prevents the online service from identifying that the different accounts belong to the same user based on public key information.

The security keys in accordance with the FIDO/U2F/FIDO2 standards prevent collection of personal information about a user to ensure user privacy and thus prevents online services from being able to link different user accounts. To maintain anonymity for the security keys, the FIDO/U2F/FIDO2 specifications require security key provider systems to ship the security keys with the same attestation certificate and private key information in large batches (e.g., 100,000 devices or more). Because core principles of the FIDO/U2F/FIDO2 standard include ensuring privacy of users, online services do not receive unique identifiers of security key devices (e.g., a serial number), and it is impossible to distinguish one device from another device from an online service's perspective. A user may own multiple security keys and register the multiple security keys for the same account to allow the user to access the account using any one of the multiple security keys, and the online service cannot distinguish an authentication request sent from one device (e.g., a company-issued authentication device) from another authentication device (e.g., a personal authentication device). Therefore, a security key cannot be traced back to a particular user.

SUMMARY

The present disclosure relates to pre-registration of security keys by a security key provider system with one or more specified applications and/or user accounts in response to a request from an enterprise. The security key provider system may perform the pre-registration with the one or more specified applications prior to distributing the security keys to the enterprise or may provide the pre-registration information to the enterprise along with the security keys to be pre-registered by the enterprise or a third party system identify their specific devices provided to their users.

While security key provider systems under the FIDO/U2F/FIDO2 standard ensure privacy preservation by making security keys indistinguishable, this scheme thus far has prevented enterprises from being able to identify specific security keys provided to users (e.g., employees) of their systems. The enterprise may benefit from being able to identify specific security keys, but because the FIDO/U2F/FIDO2 standards do not allow identifying individual security keys, it is difficult to implement this security policy. As an example of a benefit, an enterprise may want to improve its security profile by enforcing a policy to limit access to certain applications to a known set of unique security keys. For example, the enterprise may wish to only allow access to application X from pre-authorized set of security keys Y and prevent any other security keys from being able to access application X.

Systems and methods are provided herein for maintaining user privacy while enabling enterprises to impose mechanisms for limiting application access to users that authenticate using particular security keys that have been pre-registered. The pre-registration process of the present disclosure allows an enterprise to identify particular security keys that have been provided to its users, and otherwise limit application access to, sets of pre-registered security keys, while avoiding administrative burden. In an embodiment, a security key provider system may receive instructions from an enterprise to pre-register one or more security keys with a set of applications prior to sending the security keys to the enterprise. For each security key and application pair, the security key provider system identifies an authentication code and registers the authentication code of the security key to an application. The pre-registration process may be performed in batch offline using an apparatus that emulates and/or automates the registration process. In an embodiment, after the security keys are pre-registered, the security keys are then provided to the enterprise, which may distribute security keys to individuals (e.g., employees) based on corresponding set of applications for those individuals, and may record which employee is receiving each security key. In another embodiment, pre-registration information generated during the pre-registration process is provided to the enterprise along with the security keys such that the enterprise may make use of the pre-registration data at a later time. The enterprise may prevent access of applications associated with the enterprise domain from any security key that has not been pre-registered with the applications. This allows the enterprise to limit access to a particular set of security keys.

BRIEF DESCRIPTION OF THE DRAWINGS

FIG. 3 is an exemplary pre-registration information associated with one or more security keys, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
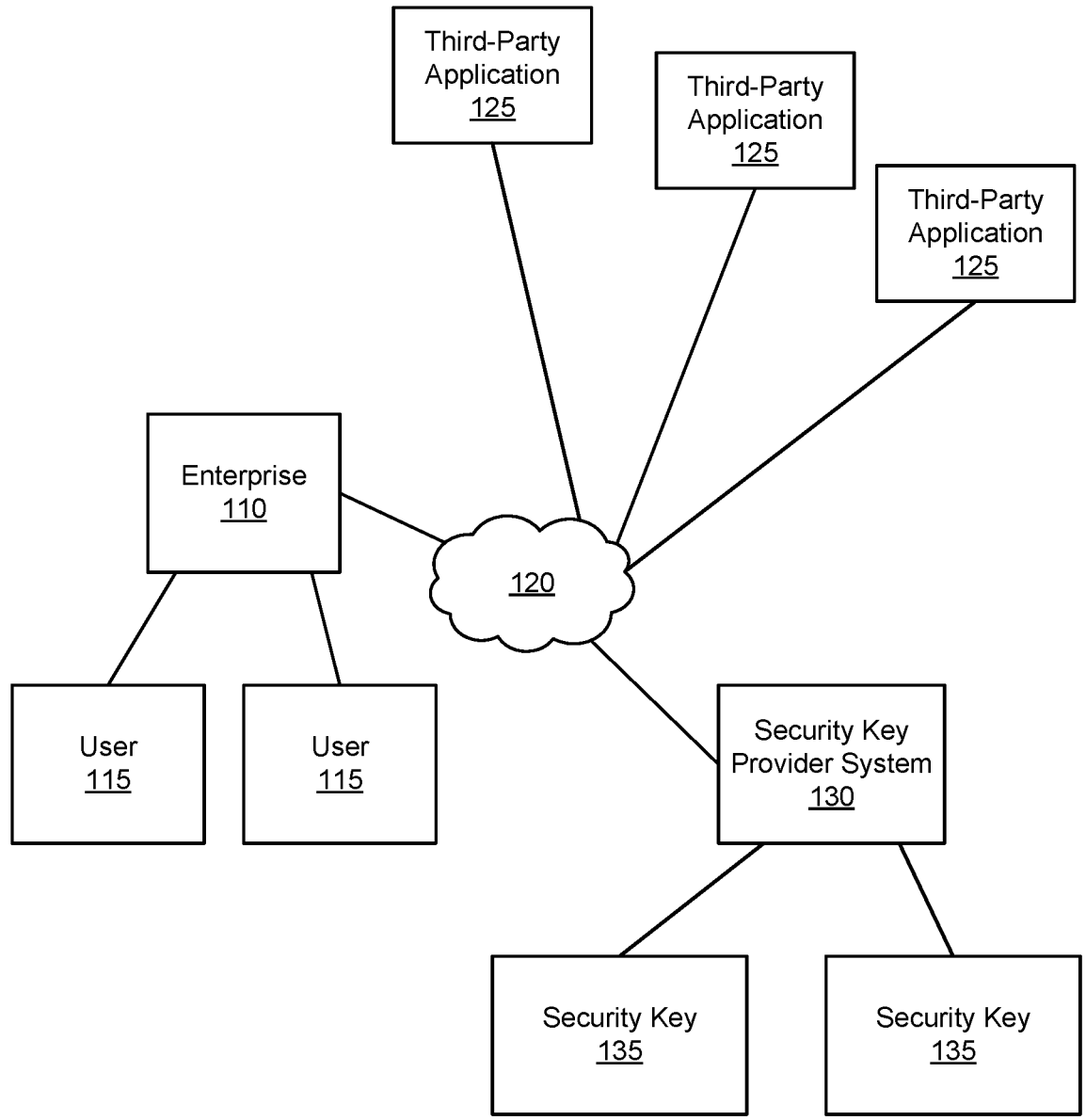
FIG. 1 is a block diagram of a system environment in which a security key provider system operates, in accordance with an embodiment.

FIG. 1 is a block diagram of a system environment 100 in which a security key provider system 130 operates. The system environment 100 shown by FIG. 1 comprises one or more enterprises 110 associated with one or more of users 115, a network 120, one or more third-party applications 125, and the security key provider system 130 that provides security keys 135. In alternative configurations, different and/or additional components may be included in the system environment 100.

The enterprise 110 is an organization such as a business or a company associated with a plurality of users 115. The plurality of users 115 may be employees of the enterprise 110. The plurality of users 115 may use third-party applications 125 using a computing device capable of receiving user input as well as transmitting and/or receiving data via the network 120. In one embodiment, the computing device is a conventional computer system, such as a desktop or a laptop computer. Alternatively, the computing device may be a device having computer functionality, such as a personal digital assistant (PDA), a mobile telephone, a smartphone, a wearable, biometric, or Internet-of-Things (IoT) device, or another suitable device. A computing device is configured to communicate via the network 120. In one embodiment, a computing device executes a browser application to enable interaction between the third-party application 125 and the computing device via the network 120. In another embodiment, a computing device interacts with the third-party application 125 through an application programming interface (API) running on a native operating system of the computing device, such as IOS® or ANDROID™.

The computing devices are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party applications 125 may be coupled to the network 120 to provide online services to the enterprise 110. A third-party application 125 may be one or more programs that provide online service to users 115 to allow the users 115 to perform tasks (e.g., manage documents, access database, send email). A third-party application 125 may be one or more websites and/or web-based services that are accessed by a user 115 of the enterprise 110 via a computing device. A third-party application 125 may be a mobile application installed on the computing device to access the online services. A third-party application 125 provides content or other information for presentation and services via a computing device to the users 115. Third-party applications 125 may be applications subscribed to by the enterprise 110, and may provide, as an example, secure e-mail for the enterprise 110 or other services.

The third-party application 125 may manage one or more user accounts for each of the users 115, and the third-party application 125 may require two-factor authentication prior to granting access to a user 115. One of the factors for the two-factor authentication may be a user login and password pair, and the other factor may be an authentication code from a security key 135. Each user account may be associated with a unique authentication code that is requested by the third-party application 125 before allowing access to services on the third-party application 125.

A security key provider system 130 provides one or more security keys 135 to the enterprise 110. The security key provider system 130 may be connected to the enterprise 110 via the network 120 and receive orders for security keys 135. An enterprise 110 may pre-register the security keys 135 with third-party applications 125 using pre-registration information received from the security key provider system 130. Alternatively, the security key provider system 130 may perform the pre-registration on behalf of the enterprise 110 prior to providing the one or more security keys 135 to the enterprise 110. Details on the security key provider system 130 is described with respect to FIG. 2.

The security key 135 is a physical device for identification and authentication of a user 115 connecting to a third-party application 125. User 115 inserts the security key into a port of a computing device. The security key 135 generates an asymmetric key pair to be used for accessing the third-party application 125. Further details on security keys themselves, as well as security key identification and authentication is provided in U.S. Pat. No. 8,806,586, the disclosure of which is hereby incorporated by reference herein in its entirety.

Figure 2:
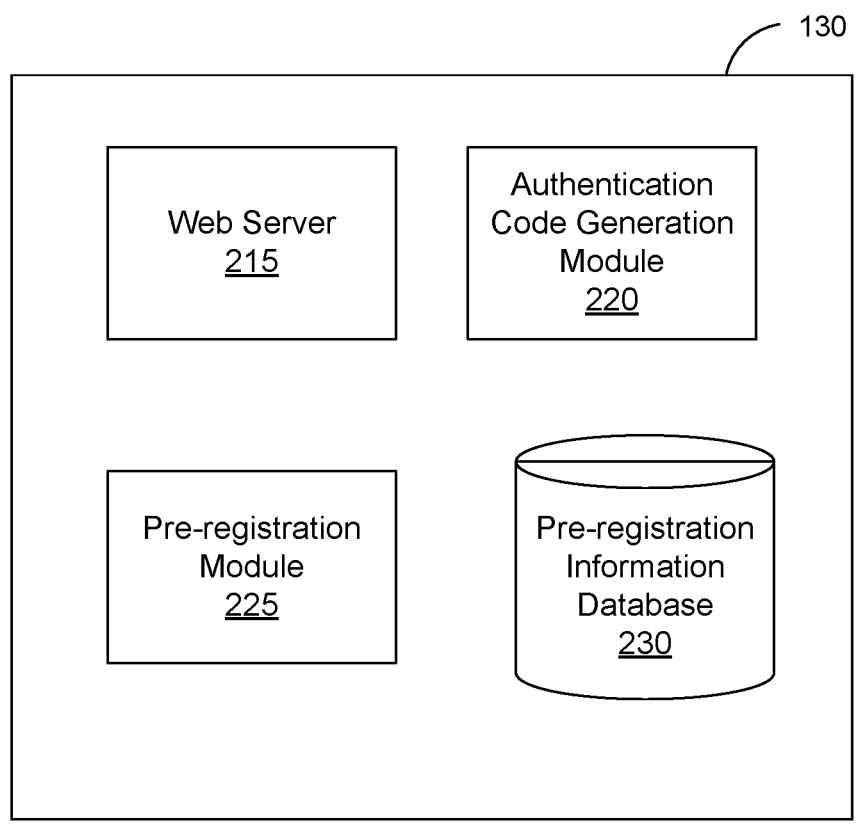
FIG. 2 is a block diagram of a security key provider system, in accordance with an embodiment.

FIG. 2 is a block diagram of a security key provider system 130, in accordance with an embodiment. The modules depicted in FIG. 2 are merely exemplary, and any number of modules may be used to affect the functionality of security key provider system 130 disclosed herein. The security key provider system 130 may include a web server 215, an authentication code generation module 220, a pre-registration module 225, and a pre-registration information database 230. In alternative configurations, different and/or additional components may be included in the security key provider system 130. Conventional components such as network interfaces, security functions, load balancers, failover servers, management and network operations consoles, and the like are not shown so as to not obscure the details of the system architecture. The security key provider system 130 may use a single processor or a multi-processor system in conjunction with a storage medium such as a non-transitory computer-readable storage medium that stores instructions executable by the processor(s) to carry out various functions described herein.

The web server 215 may link the security key provider system 130 via the network 120 to the enterprise 110, and may also link the security key provider system 130 to the one or more third-party applications 125. The web server 215 serves web pages, as well as other content, such as JAVA®, FLASH®, XML and so forth. The web server 215 may receive information from and transmit information to the enterprise 110 and the one or more third-party applications 125. Additionally, the web server 215 may provide application programming interface (API) functionality to send data directly to native client device operating systems, such as IOS®, ANDROID™, or BlackberryOS.

The security key provider system 130 receives a request from an enterprise 110 for one or more security keys 135 through the web server 215. The request may include desired model(s) of security keys 135, quantity of security keys 135, identifiers associated with third-party applications 125 for the security keys 135 to be pre-registered to, and any other parameter specified by the enterprise 110. The request may specify a different set of identifiers for third-party applications 125 for at least one security key 135 based on the needs of the users 115 that the security keys 135 will be assigned to. For example, a manager at the enterprise 110 may need access to a different set of applications or additional applications compared to a newly hired employee at the enterprise 110, so the security keys 135 are pre-registered different applications based on user needs. The request may also include a quantity of accounts and types of accounts to be pre-registered to the one or more third-party applications 125. For example, managers at the enterprise 110 may need to manage multiple accounts (e.g., one personal account and one group account) for a given application, so keys to be provided to managers many be pre-registered to be used with multiple accounts for one or more applications. The request from the enterprise 110 may also include information that identifies the enterprise 110 to the third-party applications 125 such as a domain name such that the third-party applications 125 may associate a security key 135 to the enterprise 110 after pre-registration. The web server 215 may provide a user interface (UI) to the enterprise 110 to receive the request. The UI may display options for the enterprise 110 to select models, quantity of security keys 135, and third-party application identifiers as well as additional input fields.

The authentication code generation module 220 provides instructions to security keys 135 to generate authentication codes for the pre-registration process. Based on instructions from the enterprise 110 to pre-register the security keys 135 with one or more third-party applications 125, the security key provider system 130 pre-registers the security keys 135 with each of the identified one or more third-party applications. For pre-registering a given security key 135 with the one or more third-party applications 125, the authentication code generation module 220 instructs the security key 135 to generate a unique authentication code for each of the one or more third-party applications 125. If the instructions from the enterprise 110 includes a request to pre-register a plurality of accounts to a third-party application 125, the authentication code generation module 220 instructs the security key 135 to generate a unique authentication code for each of the plurality of accounts of the third-party application 125.

The pre-registration module 225 receives authentication codes generated by security keys 135 in response to instructions from the authentication code generation module 220 and pre-registers security keys 135 using the authentication codes. Each authentication code may be an asymmetric key pair associated with an account of a third-party application 125, and the public key of the asymmetric key pair is transmitted to the third-party application 125 during the pre-registration. In addition to the public key, security key identifiers and auxiliary key information may also be collected from the authentication code generation module 220 and included in pre-registration information that is provided to the third-party application 125. The pre-registration information transmitted to the third-party application 125 may be signed and encrypted by the pre-registration module 225 prior to transmission for additional security measures.

The pre-registration module 225 may pre-register a plurality of third-party applications 125 for a same security key 135 either at the same time, or in sequence. This efficiently enables security key provider system 130 to pre-register a security key 135 for multiple third-party applications 125 requested by enterprise 110. Moreover, where a third-party application 125 has multiple sites (e.g., a top-level domain with multiple sites, such as accounts.acme.com; recovery.acme.com; security.acme.com), the pre-registration may occur for each of these multiple sites. Pre-registration module 225 may determine the multiple sites by, for example, performing a web crawling operation through links found at a page of the top-level domain, and following links at each subsequent page, where the sub-domains based on the addresses of the crawled pages. Each of the multiple sites may be pre-registered with a same authentication code such that a same account is pre-registered across the multiple sites, or different authentication codes may be used for some or all of the multiple sites of the third-party application. This may occur for multi-domains and cross-domains; for example, if acme.com just bought acme2.com, the pre-registration process can cover all the different sub-companies or sub-organizations in one automated way, thus simplifying the registration process. Similarly, the multi-domains and cross-domains may be pre-registered with a same authentication code such that a same account is pre-registered across the domains, or different authentication codes may be used for some or all of the domains.

The pre-registration module 225 may pre-register a plurality of accounts for a given security key 135 for one or more of the third-party applications 125. The security key provider system 130 may receive a request from the enterprise 110 for a security key 135 to be registered to a plurality of accounts for one or more third-party applications 125. A unique authentication code is generated for each of the plurality of accounts by the security key 135, and the public key of the authentication code is transmitted to the third-party application 125 for each of the plurality of accounts during the pre-registration.

Typically, a security key provider system 130 distributes security keys without first performing a pre-registration process. The security key provider system 130 simply receives an order for one or more security keys 135 from a user, and the security key provider system 130 fulfills the order by providing the user with an untouched security key. When the user seeking to set up two-factor authentication receives the security key 135, the user sets up the security key 135 for future authentication sessions with each of the user's accounts with one or more online services by registering the security key 135 with the accounts. The registration process may require a user to log into the account using a username and password pair through a computing device (e.g., laptop, phone), provide the security key to the computing device (e.g., plugging the security key into a laptop, tapping the security key against a phone), and then provide explicit instructions to the security key to generate and transmit a unique authentication code for the account (e.g., touch a button on the security key). The unique authentication code may be an asymmetric key pair, and the public key is stored by the online service in association with the account. Once the security key is registered, the online service can use the authentication code to verify a user's identity during a future authentication session.

By design, in a typical registration process, the security keys 135 require a human touch with a button or another sensor to prove physical presence of a user during registration to prevent unwanted remote access of the security keys 135. However, for pre-registering the security keys 135, the security keys 135 may be set to a state during manufacturing or during a batch pre-registration process post-manufacturing that eliminates the touch requirement during pre-registration. With the elimination of the touch requirement, the pre-registration process may be performed in batches for a plurality of security keys 135 instead of requiring a human operator to repeat touching the button for each registration with an application.

In some embodiments, the security key provider system 130 communicates with the third-party applications 125 for pre-registration via connection through the network 120. In other embodiments, the pre-registration module 225 transmits the authentication code to the third-party applications 125 using an apparatus that automates pre-registration by emulating a connection with a website of the third-party application 125. However, the emulation of network connection may be performed offline and in batches for a plurality of security keys 135 at once. The security key provider system 130 performs the emulation by performing the pre-registration (e.g., communicating to a hardware authenticator) as if pre-registration module 225 were a platform or browser. When performing this emulation, pre-registration module 225 may or may not be transmitting communications to the associated third-party application 125. Similarly, when performing this emulation, pre-registration module 225 may or may not be adding pre-registration information during the pre-registration process to the third-party application 125 in substantially real time. That is, the pre-registration module 225 may provide the pre-registration information to the third-party application 125 for a set of security keys 135 after pre-registration information is generated for the set of security keys 135. Yet similarly, when performing this emulation, pre-registration module 225 may or may not be doing so by using FIDO/U2F/FIDO2 or web-authentication JavaScript APIs. Rather, the emulation may be a simulation of that experience, where pre-registration information may be delivered or used later to third-party application 125.

In some embodiments, the pre-registration module 225 directly uploads the authentication code information to the third-party application 125 on behalf of an enterprise 110. In another embodiment, the security key provider system 130 provides authentication code information to the enterprise 110 or another party to be uploaded to the third-party application 125. Security key provider system 130 may use the client to authenticator protocol ("CTAP"). Pre-registration module 225 may use CTAP when performing pre-registration.

After the security keys 135 have been pre-registered, the security keys 135 are provided to an enterprise 110 to be provisioned to the users 115. When the security keys 135 are provided to the enterprise 110, the enterprise 110 may also receive pre-registration information that identifies which third-party applications 125 each of the security keys 135 have been pre-registered with. Because the security keys 135 have already been pre-registered, the users 115 do not need to perform the registration prior to authentication. When the users 115 attempt to access a third-party application 125 by presenting an assigned security key 135 for authentication, the third-party application 125 checks whether the private key of the security key 135 matches with one of the public keys that were provided to the third-party application 125 during pre-registration. If the third-party application 125 determines that there is a match, the third-party application 125 grants access to the user 115. Otherwise, the third-party application 125 determines that the security key 135 has not been pre-registered and does not allow the user 115 to authenticate using the security key 135 by denying the authentication.

The enterprise 110 may specify to one or more third-party applications 125 to restrict access to the respective application unless a user 115 authenticates using an authentication code that has been pre-registered. The enterprise 110 may limit access to an application to specific users on specific security keys 135. The security keys 135 may be configured to specific users using device identity mapping. In one embodiment, an enterprise 110 may provide user identification (e.g., employee identification number) to be included in a pre-registration of a security key 135. The user identification may be stored in the pre-registration information data base 230 and uploaded to third-party applications 125 by the security key provider system 130 during pre-registration. In another embodiment, the security keys 135 may be set to a configuration in which an enterprise 110 may add user identification for each security key 135 when the security keys 135 are registered by the enterprise 110 (instead of the security key provider system 130) with third-party applications 125. The enterprise 110 may provide instructions to the third-party applications 125 to restrict access to its respective application according to user identification, where a table of authorized user identification is provided to the third-party applications 125 by the enterprise 110.

The pre-registration information database 230 stores pre-registration information to be provided to one or more third-party applications 125. In one embodiment, the pre-registration information includes authentication codes generated by the security keys 135, security key identifiers, auxiliary key information, information associated with an enterprise 110 that the security keys 135 are to be pre-registered to, and a third-party application identifier for the pre-registration information to be uploaded to. The pre-registration information in the pre-registration information data base 230 may be uploaded to a third-party application 125 by the security key provider system 130 with authorization from an enterprise 110 or transmitted to the enterprise 110 to be uploaded by the enterprise 110 or a different party. An exemplary table of pre-registration information for a given security key is shown in FIG. 3.

FIG. 3 is an exemplary pre-registration information associated with one or more security keys, in accordance with an embodiment. Table 300 includes various information that might be encoded during pre-registration, including a timestamp 310 of the pre-registration process, a serial number 320 of the security key 135 being pre-registered, an application ID 330, a challenge 340, a public point 350, a key handle 360, a registration signature 370, and an attestation certificate 380. These parameters are merely exemplary; any other parameters may be used. Each row of the table 300 represents a pre-registration process of a security key 135 associated with the serial number 320 with a third-party application 125 associated with the application ID 330. Although not shown in the figures, each security key 135 may be pre-registered with a plurality of third-party applications 125. Moreover, for each of the plurality of the third-party applications 125, a plurality of accounts may be pre-registered to the security key 135.

The timestamp 310 indicates a time at which a pre-registration process is initiated by the security key provider system 130. The timestamp may represent when an associated authentication code was generated and may be used for any useful purpose such as verification or indexing.

The serial number 320 is a unique identifier associated with a security key 135 assigned by the security key provider system 130. The serial number 320 may identify a particular security key 135 as well as a model of the security key 135. For example, a portion of the serial number 320 may correspond to the model of the security key 135. The serial number 320 may be used by the security key provider system 130 to identify which sets of third-party applications 125 the associated security key 135 is pre-registered to.

The application ID 330 identifies a third-party application 125 that the security keys 135 are pre-registered to. When the enterprise 110 sends a request to the security key provider system 130 to pre-register one or more security keys 135 to one or more third-party applications 125, the request may include the application IDs 330 associated with the one or more third-party applications 125. In some embodiments, the enterprise 110 may provide an identifier associated with a third-party application 125 (e.g., name of the third-party application) to the security key provider system 130, and the security key provider system 130 may look up one or more application IDs 330 associated with the identifier. A third-party application 125 may have a domain associated with multiple sites or multiple domains, and the security key provider system 130 may automatically identify one or more application ID 330 associated with the third-party application 125 such that the pre-registration process is performed for all the different sub-companies or sub-organizations associated with the third-party application 125, which simplifies the pre-registration process for the enterprise 110. In some embodiments, the application ID 330 may be a relying party identifier.

The challenge 340 is data received from a server associated with a third-party application 125 during pre-registration process of a security key 135. The security key provider system 130 may receive the challenge 340 from the third-party application 125 when it connects to the third-party application 125 during the pre-registration process. The challenge 340 may be unique to each pre-registration process, and the challenge 340 may be different for each of the plurality of security keys 135 that are being pre-registered with a same third-party application 125. The challenge 340 is signed by a private key of the corresponding security key 135 and sent as a response to the third-party application 125 when the security key 135 is used to authenticate the security key 135 with the third-party application 125 following the pre-registration process.

The public point 350 is a value representative of a public key of an authentication code associated with a pre-registration process. The authentication code may be generated using elliptic-curve cryptography (ECC), and the public point 350 may be an (x,y) representation of a point on the elliptic curve.

The key handle 360 is an identifier associated with each authentication code that allows a security key 135 to identify a private key during authentication. Each security key 135 may manage a plurality of authentication codes, and the key handle 360 allows the security key 135 to distinguish the plurality of authentication codes. During pre-registration of an authentication code with a third-party application 125, the pre-registration module 225 provides a key handle 360 to the third-party application 125 along with the public key of the authentication code. The third-party application 125 stores the key handle 360 with the public key. After pre-registration, when the security key 135 is used to authenticate a user, the third-party application 125 sends the key handle 360 to the security key 135 to indicate which authentication code should be used for the authentication. In some embodiments, the key handle 360 may be a credential ID.

The registration signature 370 is a signature over the application ID 330, the challenge 340, the public point 350, and the key handle 360. The registration signature 370 is sent to the third-party application 125 corresponding to the application ID 330. Responsive to receiving the registration signature 370, the third-party application 125 verifies the registration signature 370. Responsive to verifying the registration signature 370, the third-party application 125 stores the pre-registration information included in the table 300 to be used for future authentication processes.

The attestation certificate 380 is information that proves that an associated authentication code was generated by a genuine security key 135 of the security key provider system 130. The attestation certificate 380 may be shared by a plurality of security keys 135, for example, security keys 135 from a same manufacturing batch.

After pre-registering the security keys 135, the security key provider system 130 may provide the table 300 to the enterprise 110 such that the enterprise 110 may correctly provision the different types of security keys 135 to its employees. For example, employee A of the enterprise 110 may require a security key 135 that has been registered with applications x and y while employee B of the enterprise 110 may require a security key 135 that has been registered with applications x and z. The table 300 may allow the enterprise 110 to map the security key 135 to the third-party applications 125 it was pre-registered to.

In some embodiments, the security key provider system 130 may provide the table 300 to the enterprise 110 along with the security keys 135 such that the enterprise 110 may perform the pre-registration using the pre-registration information.

Figure 4:
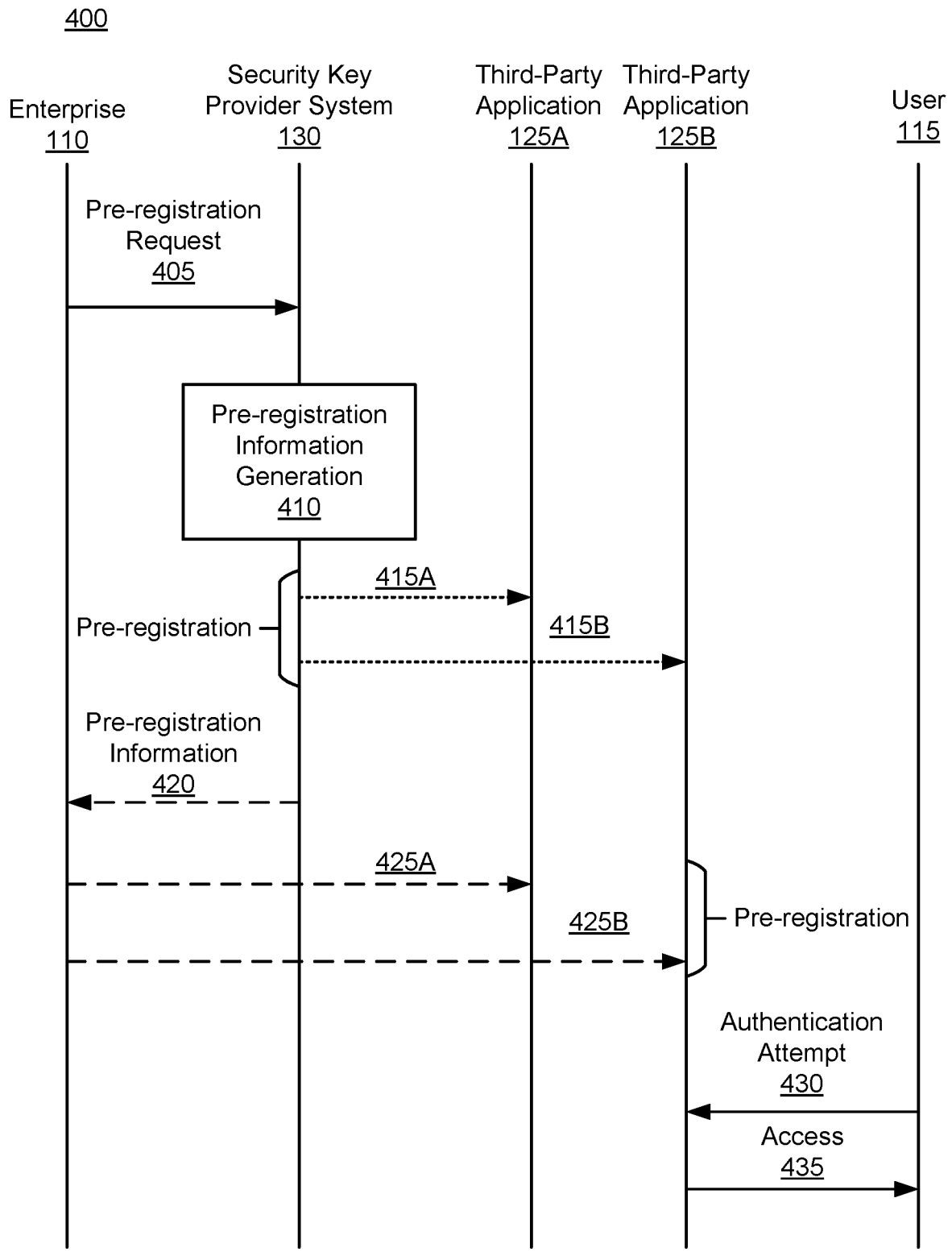
FIG. 4 is an interaction diagram illustrating a pre-registration process, in accordance with an embodiment.

FIG. 4 is an interaction diagram 400 illustrating a pre-registration process, in accordance with an embodiment. The interaction diagram 400 illustrates interactions between an enterprise 110, a security key provider system 130, a first third-party application 125A, a second third-party application 125B, and a user 115 during pre-registration and authentication.

The enterprise 110 sends 405 a request to the security key provider system 130 to pre-register one or more security keys. The request may include desired model(s) of security keys, quantity of security keys, identifiers associated with third-party applications 125 for the security keys to be pre-registered to. The request may also indicate whether pre-registration information is to be provided to the third-party applications 125 by the security key provider system 130 on behalf of the enterprise 110 or whether to send the pre-registration information to the enterprise 110 such that the enterprise 110 may complete the process by uploading the pre-registration information.

Based on the request, the security key provider system 130 sends instructions to the one or more security keys to be pre-registered to generate authentication codes. Each security key may be pre-registered to one or more third-party applications 125, and the security key may generate a different authentication code for each of the one or more third-party applications 125 included in the request for pre-registration. Based on the authentication codes, the security key provider system 130 may generate 410 pre-registration information (e.g., information included in table 300).

In one embodiment, the security key provider system 130 provides 415A pre-registration information associated with one or more security keys to be pre-registered with the first third-party application 125A. The third-party application 125A may be associated with one or more application IDs (e.g., application ID 330), and pre-registration information for these one or more application IDs may be provided by the security key provider system 130 to the first third-party application 125A on behalf of the enterprise 110. The security key provider system 130 may provide pre-registration information in real-time as pre-registration information for a particular security key is generated or the security key provider system 130 may emulate the pre-registration process for a batch of security keys and deliver the pre-registration information for the entire batch at once. Similarly, the security key provider system 130 provides 415B pre-registration information to be pre-registered with the second third-party application 125B. Different sets of security keys may be pre-registered with the first third-party application 125A and the second third-party application 125B.

In another embodiment, the enterprise 110 requests that the security key provider system 130 generate 410 the pre-registration information without uploading the pre-registration information to the third-party applications 125A, 125B. Instead, the security key provider system 130 provides 420 the pre-registration information to the enterprise 110 for the enterprise 110 to upload the pre-registration information to the third-party applications 125A, 125B. Responsive to receiving the pre-registration information, the enterprise 110 uploads 425A the pre-registration information associated with the first third-party application 125A to the first third-party application 125A and uploads 425B the pre-registration information associated with the second third-party application 125B to the second third-party application 425B to complete pre-registration.

The security key provider system 130 provides one or more security keys to the enterprise 110 according to the request from the enterprise 110 that are either already pre-registered by the security key provider system 130 or pre-registered by the enterprise 110 using the pre-registration information from the security key provider system 130. Responsive to receiving the security keys, the enterprise 110 provisions the security keys to users 115 associated with the enterprise 110. The one or more security keys may be pre-registered to different sets of applications. A security key may be matched to a user 115 based on the types of third-party applications 125 that the security key is pre-registered with. For example, the user 115 may require access to both the first third-party application 125A and the second third-party application 125B, so the enterprise 110 provides a security key that has been pre-registered with both of the third-party applications 125.

In an example, after receiving the security key from the enterprise 110, the user 115 attempts to authenticate 430 with the second third-party application 125B using the security key. If the received security key has been pre-registered with the second third-party application 125B, the second third-party application 125B allows 435 the authentication. Otherwise, the second third-party application 125B denies the authentication.

Figure 5:
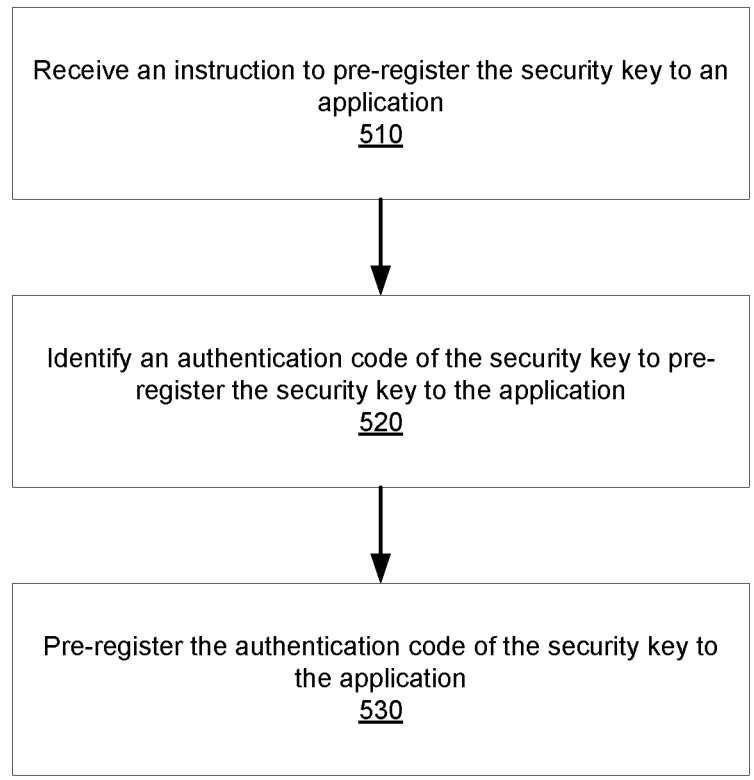
FIG. 5 is a flowchart illustrating a process of pre-registering a security key, in accordance with an embodiment.

FIG. 5 is a flowchart illustrating a process 500 of pre-registering a security key, in accordance with an embodiment. In the process 500 for pre-registering, a security key provider receives 510 an instruction (e.g., from enterprise 110) to pre-register the security key to an application (e.g., third-party application 125). In response to receiving the instruction, the security key provider identifies 520 an authentication code of the security key to pre-register the security key to the application (e.g., using authentication code generation module 220). The security key provider may instruct the security key to generate an authentication code for the pre-registration. Based on the generated authentication code, the security key provider pre-registers 530 the authentication code of the security key for the specified application. Because the security key has been pre-registered, when a user attempts to authenticate with the application, the application authenticates the user using the authentication code without the user having to register the security key.

As described above, because of the design of the FIDO/U2F/FIDO2 standard, it is not easy for an enterprise with hundreds or thousands of employees to ensure that the employees are accessing applications with only a set of company authorized security keys and prevent any other security key (e.g., personal security keys) from accessing the applications. In one embodiment, the enterprise may manually tag security keys and register devices for applications during a provisioning process. However, this is administratively burdensome and time consuming as each device needs to be with each application to be used by a user. The security keys are designed to perform a physical user presence test by requiring human interaction such as touching a button to provide explicit instructions to generate and transmit a unique authentication code during the registration process with an account. Therefore, it would be time consuming and expensive to implement this approach of a human administrator registering each device for a plurality of applications, especially for an enterprise with a large workforce. Instead, the above-described pre-registration of security keys allows for enterprises to control application access without having to manually tag and link each security key with a user account during provisioning.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

What is claimed is:

1. A method comprising:
   receiving, by a security key provider system, instructions to pre-register a plurality of security keys to one or more applications, wherein the plurality of security keys are physical devices, each physical device associated with a user;

identifying, by the security key provider system, respective authentication codes generated by the plurality of security keys to pre-register each respective security key of the plurality of security keys to a respective application of the one or more applications, wherein each authentication code comprises a respective public key and a respective private key; and pre-registering, by the security key provider system, a respective public key of a respective authentication code of each security key to its respective application, wherein, responsive to determining a respective user attempt to authenticate with an application of the one or more applications after the pre-registering by interaction with a respective security key, the application grants access to the respective user using the respective authentication code without requiring registration, by the respective user, of the respective security key, based on the respective private key of the respective security key matching the respective public key, and wherein the pre-registering is performed for the plurality of security keys at a same time in batch.

2. The method of claim 1, wherein pre-registering the respective public key of the respective authentication code of the respective security key to its respective application comprises uploading, by the security key provider system, the respective authentication code to the respective application.

3. The method of claim 1, wherein pre-registering the respective public key of the respective authentication code of the respective security key to its respective application comprises providing the respective authentication code to a respective enterprise, the respective authentication code uploaded to the application by the respective enterprise.

4. The method of claim 1, wherein pre-registering the respective public key of the respective authentication code of the respective security key to its respective application:
emulating a connection to the respective application; and
providing the respective authentication code to the application through the emulated connection.

5. The method of claim 1, wherein the respective security key is pre-registered to a set of applications comprising the respective application, and wherein the respective security key is pre-registered to each application of the set of applications with a different authentication code.

6. The method of claim 1, wherein the respective application is associated with a plurality of sites, and the plurality of sites are pre-registered with a same authentication code.

7. The method of claim 1, wherein the respective application is associated with a plurality of domains, and the plurality of domains are pre-registered with a same authentication code.

8. The method of claim 1, wherein the respective security key is pre-registered to the respective application under a plurality of accounts, each of the plurality of accounts pre-registered with a different authentication code.

9. A non-transitory computer-readable medium comprising computer program instructions that, when executed by one or more computer processors, cause the one or more computer processors to perform steps comprising:
receiving, by a security key provider system, instructions to pre-register a plurality of security keys to one or more applications, wherein the plurality of security keys are physical devices, each physical device associated with a user;
identifying, by the security key provider system, respective authentication codes generated by the plurality of security keys to pre-register each respective security key of the plurality of security keys to a respective application of the one or more applications, wherein each authentication code comprises a respective public key and a respective private key; and
pre-registering, by the security key provider system, a respective public key of a respective authentication code of each security key to its respective application, wherein, responsive to determining a respective user attempt to authenticate with an application of the one or more applications after the pre-registering by interaction with a respective security key, the application grants access to the respective user using the respective authentication code without requiring registration, by the respective user, of the respective security key, based on the respective private key of the respective security key matching the respective public key, and wherein the pre-registering is performed for the plurality of security keys at a same time in batch.

10. The non-transitory computer-readable medium of claim 9, wherein pre-registering the respective public key of the respective authentication code of the respective security key to its respective application comprises uploading, by the security key provider system, the respective authentication code to the respective application.

11. The non-transitory computer-readable medium of claim 9, wherein pre-registering the respective public key of the respective authentication code of the respective security key to its respective application comprises providing the respective authentication code to a respective enterprise, the respective authentication code uploaded to the application by the respective enterprise.

12. The non-transitory computer-readable medium of claim 9, wherein pre-registering the respective public key of the respective authentication code of the respective security key to its respective application:
emulating a connection to the respective application; and
providing the respective authentication code to the application through the emulated connection.

13. The non-transitory computer-readable medium of claim 9, wherein the respective security key is pre-registered to a set of applications comprising the respective application, and wherein the respective security key is pre-registered to each application of the set of applications with a different authentication code.

14. The non-transitory computer-readable medium of claim 9, wherein the respective application is associated with a plurality of sites, and the plurality of sites are pre-registered with a same authentication code.

15. The non-transitory computer-readable medium of claim 9, wherein the respective application is associated with a plurality of domains, and the plurality of domains are pre-registered with a same authentication code.

16. The non-transitory computer-readable medium of claim 9, wherein the respective security key is pre-registered to the respective application under a plurality of accounts, each of the plurality of accounts pre-registered with a different authentication code.

17. A system comprising:
one or more processors; and
a non-transitory computer-readable medium comprising computer program instructions that, when executed by the one or more processors, causes the one or more processors to perform steps comprising:
receiving, by a security key provider system, instructions to pre-register a plurality of security keys to one or more applications, wherein the plurality of security keys are physical devices, each physical device associated with a user;

identifying, by the security key provider system, respective authentication codes generated by the plurality of security keys to pre-register each respective security key of the plurality of security keys to a respective application of the one or more applications, wherein each authentication code comprises a respective public key and a respective private key; and pre-registering, by the security key provider system, a respective public key of a respective authentication code of each security key to its respective application, wherein, responsive to determining a respective user attempt to authenticate with an application of the one or more applications after the pre-registering by interaction with a respective security key, the application grants access to the respective user using the respective authentication code without requiring registration, by the respective user, of the respective security key, based on the respective private key of the respective security key matching the respective public key, and wherein the pre-registering is performed for the plurality of security keys at a same time in batch.

18. The system of claim 17, wherein pre-registering the respective public key of the respective authentication code of the respective security key to its respective application comprises uploading, by the security key provider system, the respective authentication code to the respective application.

19. The system of claim 17, wherein pre-registering the respective public key of the respective authentication code of the respective security key to its respective application comprises providing the respective authentication code to a respective enterprise, the respective authentication code uploaded to the application by the respective enterprise.

20. The system of claim 17, wherein pre-registering the respective public key of the respective authentication code of the respective security key to its respective application:

emulating a connection to the respective application; and providing the respective authentication code to the application through the emulated connection.

\* \* \* \* \*